(12) United States Patent
Zebrowski

(10) Patent No.: US 8,496,060 B2
(45) Date of Patent: Jul. 30, 2013

(54) METHOD FOR SEQUESTERING CARBON DIOXIDE IN GEOLOGICAL FORMATIONS

(76) Inventor: Daniel R. Zebrowski, Spring, TX (US)

( * ) Notice: Subject to any disclaimer, the term of this patent is extended or adjusted under 35 U.S.C. 154(b) by 386 days.

(21) Appl. No.: 12/829,455

(22) Filed: Jul. 2, 2010

(65) Prior Publication Data
US 2011/0013986 A1  Jan. 20, 2011

Related U.S. Application Data

(60) Provisional application No. 61/226,914, filed on Jul. 20, 2009.

(51) Int. Cl.
 *E21B 43/25* (2006.01)
(52) U.S. Cl.
 USPC .......................................... 166/306; 166/402
(58) Field of Classification Search
 None
 See application file for complete search history.

(56) References Cited

U.S. PATENT DOCUMENTS

2010/0000737 A1 * 1/2010 Ramakrishnan et al. ..... 166/297

* cited by examiner

*Primary Examiner* — Zakiya W Bates
(74) *Attorney, Agent, or Firm* — Thompson Hine L.L.P.

(57) ABSTRACT

A method for enhancing the storage of carbon dioxide underground. The method comprises locating a geological formation comprising a first storage reservoir having a first surface and a second surface, a first seal layer adjacent the first surface of the first storage reservoir, a second seal layer adjacent the second surface of the first storage reservoir, and a second storage reservoir adjacent the first seal layer opposite the first storage reservoir; directing carbon dioxide into the first storage reservoir, the carbon dioxide being at a first pressure within the first storage reservoir; directing a fluid into the second storage reservoir, the fluid being at a second pressure within the second storage reservoir; and maintaining the second pressure at generally the same or larger pressure than the first pressure of the carbon dioxide to reduce leakage of $CO_2$.

11 Claims, 6 Drawing Sheets

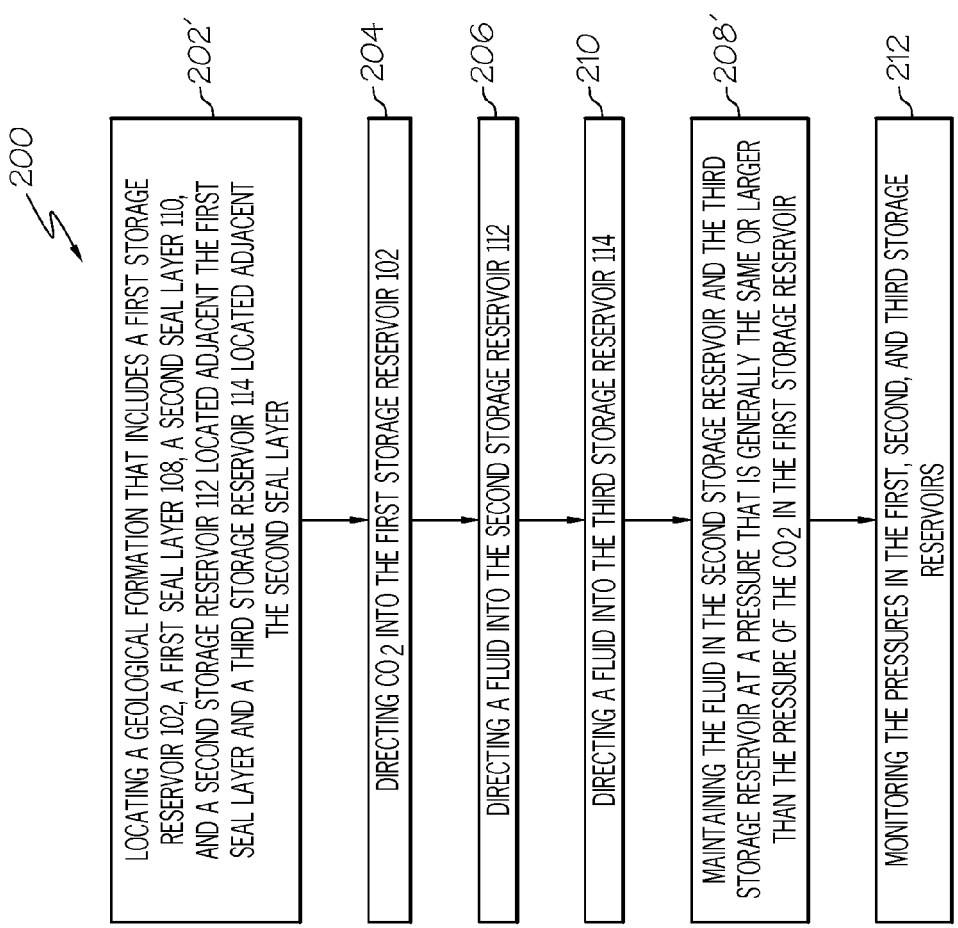

METHOD FOR SEQUESTERING CARBON DIOXIDE IN GEOLOGICAL FORMATIONS

PRIORITY

The present patent application claims priority from U.S. Ser. No. 61/226,914 filed on Jul. 20, 2009, the entire contents of which are incorporated herein by reference.

FIELD

The present patent application relates to sub-surface sequestration and, more particularly, to sequestration of carbon dioxide in geological formations.

BACKGROUND

Carbon dioxide can be contained in subsurface geological units (formations) by a process known as $CO_2$ sequestration or enhanced hydrocarbon recovery. The $CO_2$ stored underground may originate from carbon emissions or from other naturally occurring sources of $CO_2$. The $CO_2$ is delivered to the storage site via normal transport from pipelines in a liquefied state or can be liquefied on site and is then pumped underground into a geological layer that has adequate porosity and permeability for storing $CO_2$, referred to as a storage reservoir. The storage reservoir acts as a container for storing the $CO_2$ when geological seal layers, e.g., overlying seal, underlying seal, adjacent seal or fault seal, are positioned above and below and adjacent the storage reservoir. The storage reservoir is typically composed of porous rocks with higher porosity and permeability, for example sandstones, carbonates and chalks. The geological seal layer is typically composed of rocks that are less permeable, for example shales, salts of anhydrites, and low porosity limestones of sandstones.

The seal or cap rock will have a certain capacity to hold the $CO_2$ within the storage reservoir without leaking. These properties for containing $CO_2$ largely relate to the seal capacity which is related to a number of variables including but not limited to porosity, permeability, and interfacial tension of the different molecules of various fluids oil, gas $CO_2$ and water in combination, pressure, temperature and geomechanical properties of rock strength. Accordingly, the natural characteristics of the cap rock formation are relied on for sealing and containing the $CO_2$. When the $CO_2$ is injected and stored in the storage reservoir it increases the pressure on geological seal layers, and if the pressure is increased too much it will breach the cap rock by dilation or leakage of mechanically fracturing the rock. A breach in the cap rock will release the $CO_2$ from containment and contaminate other geological zones, which may include the atmosphere, and lead to serious environmental consequences. Accordingly, underground sequestration of $CO_2$, while effective for storing $CO_2$, faces the problem of cap rock fractures or leakage that can allow $CO_2$ to leak from the storage reservoir.

Herein, a method is disclosed that enhances the storage of carbon dioxide underground by balancing the pressure the $CO_2$ applies to the seal rock by pressurizing at least one additional storage reservoir adjacent to the seal rock with the pressure of a fluid directed into that additional storage reservoir. The pressure of the fluid is maintained at generally the same pressure of the $CO_2$ within its storage reservoir or at a pressure larger than the pressure of the $CO_2$ within its storage reservoir. This balance of pressure exerted on the seal layer reduces the occurrence of a breach in the seal layer for longer, safer $CO_2$ storage.

SUMMARY

In one aspect, a method for enhancing the storage of carbon dioxide underground is disclosed. The method comprises locating a geological formation that includes, but is not limited to, a first storage reservoir having a first surface and a second surface, a first seal layer adjacent the first surface of the first storage reservoir, a second seal layer adjacent the second surface of the first storage reservoir, and a second storage reservoir adjacent the first or the second seal layers opposite the first storage reservoir; directing carbon dioxide into the first storage reservoir, the carbon dioxide being at a first pressure within the first storage reservoir; directing a fluid into the second storage reservoir, the fluid being at a second pressure within the second storage reservoir; and maintaining the second pressure at generally the same or larger pressure than the first pressure of the carbon dioxide to reduce the occurrence of a breach in the first seal layer and/or the second seal layer.

In another aspect, the geological formation includes the second storage reservoir adjacent the first seal layer, and a third storage reservoir adjacent the second seal layer. The method also includes directing a fluid into the third storage reservoir, with the fluid in the third storage reservoir at a third pressure, and maintaining the third pressure at generally the same or larger pressure than the first pressure of the carbon dioxide.

In yet another aspect, the method includes monitoring the pressure in the first storage reservoir and the second storage reservoir, and the third storage reservoir when present.

In yet another aspect, the fluid in the second storage reservoir and the third storage reservoir may be the same or different. The fluid may be water or a composition comprising water from an above ground or an underground source.

Other aspects of the disclosed method for sequestering carbon dioxide in geological formations will become apparent from the following description, the accompanying drawings and the appended claims.

BRIEF DESCRIPTION OF THE DRAWINGS

FIGS. 2A and 2B are flow charts of methods for enhancing the underground storage of carbon dioxide.

DETAILED DESCRIPTION

Figure 1:
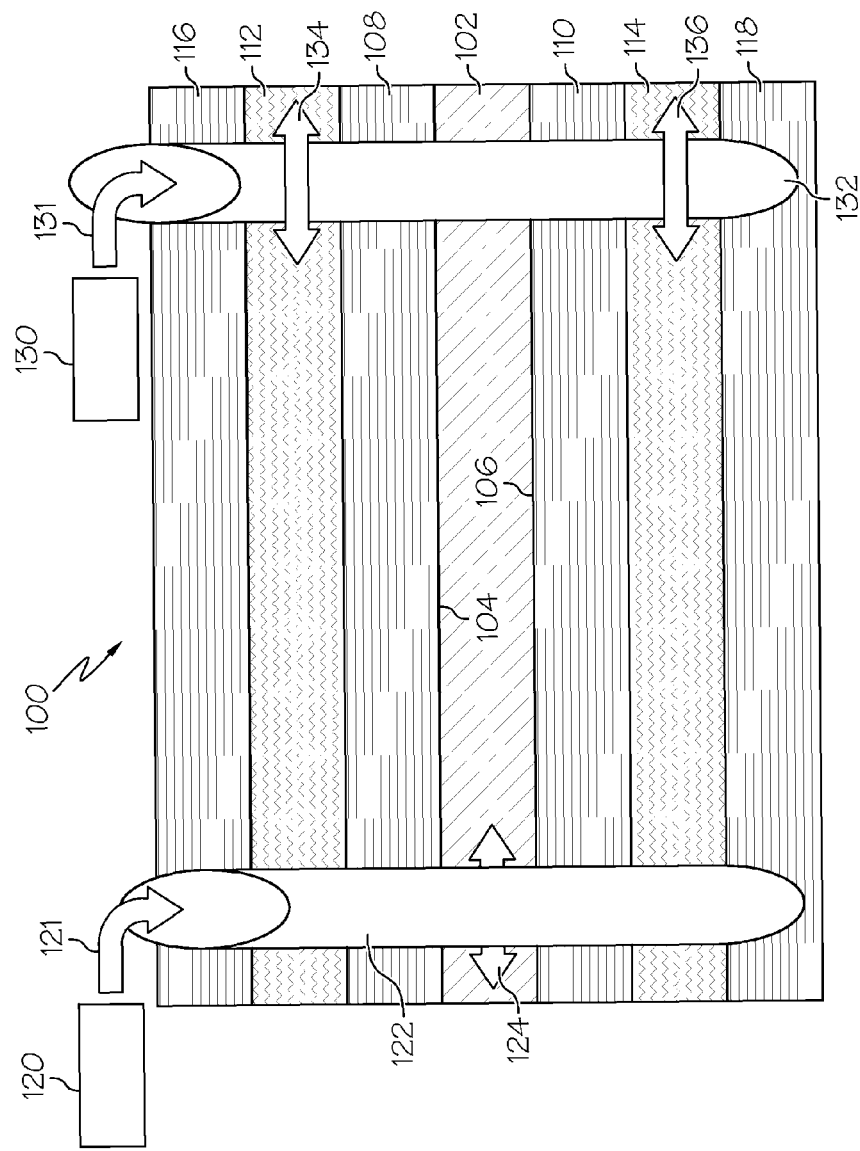
FIG. 1 is a side cross-sectional view of a geological formation including a bore placing a carbon dioxide source in fluid communication with a first storage reservoir and a second bore placing a fluid source in fluid communication with both a second storage reservoir and a third storage reservoir.

It is to be understood that the figures and descriptions of the present invention may have been simplified to illustrate elements that are relevant for a clear understanding of the present invention. Those of ordinary skill in the art will recognize that other elements may be desirable and/or required in order to implement the underground storage of carbon dioxide. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Figure 2A:
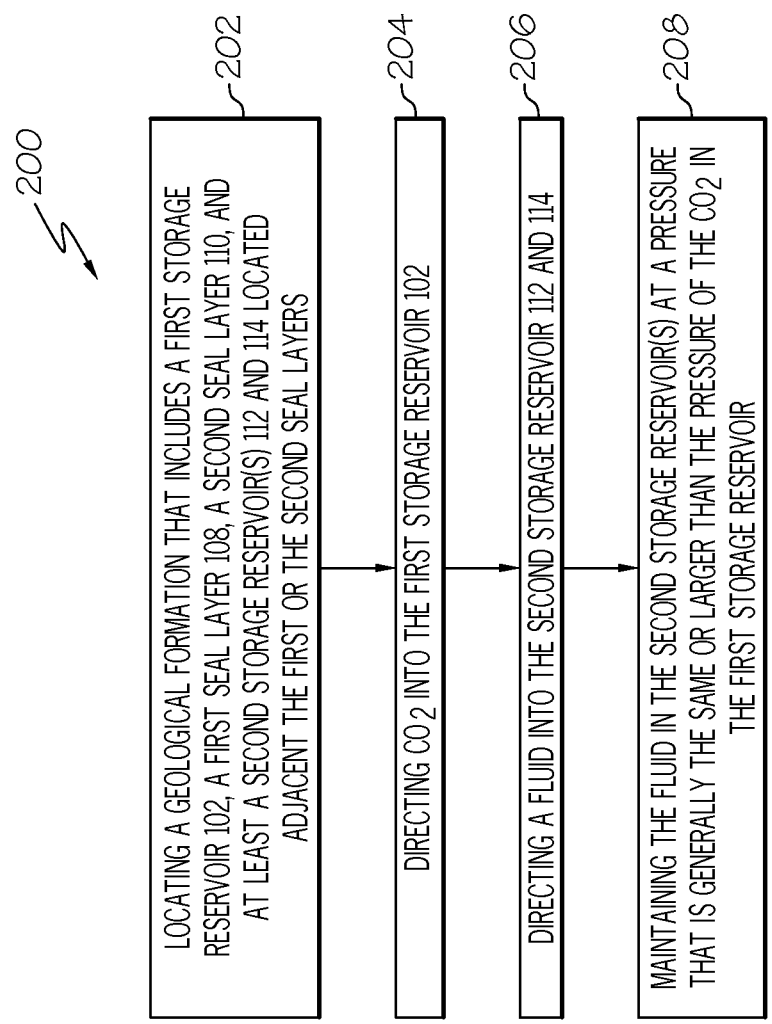

Referring to FIGS. 1 and 2A-2B, a method 200 is disclosed for enhancing the storage of carbon dioxide underground in a suitable geological formation by increasing the sealing capacity of seal layers (e.g., cap rock) by controlling the pressures applied to the seal layers. The method 200 may include locating 202 a geological formation 100 that includes, but is not limited to, a first storage reservoir 102 having a first surface 104 and a second surface 106, a first seal layer 108 adjacent the first surface 104 of the first storage reservoir 102, a second seal layer 110 adjacent the second surface 106 of the first storage reservoir 102, and a second storage reservoir 112 adjacent the first seal layer 108 opposite the first storage reservoir. In an alternate embodiment, the second storage reservoir may be adjacent the second seal layer 110 opposite the first storage reservoir. The method includes directing 204 carbon dioxide into the first storage reservoir 102, the carbon dioxide being at a first pressure within the first storage reservoir and directing 206 a fluid, which may be a liquid or a gas, into the second storage reservoir 112, the fluid being at a second pressure within the second storage reservoir. The method also includes maintaining 208 the second pressure at generally the same or a larger pressure than the first pressure of the carbon dioxide to reduce the occurrence of a breach in the first and/or the second seal layers.

As shown in FIG. 1, the geological formation 100 includes a third storage reservoir 114 adjacent the second seal layer 110, a third seal layer 116 adjacent the second storage reservoir 112 opposite the first seal layer 118 and a fourth seal layer 118 adjacent the third storage reservoir 114 opposite the second seal layer 110.

A $CO_2$ source 120 may be connected to a bore 122 placing the $CO_2$ in fluid communication with the first storage reservoir 102. The bore 122 may include a port 124 through which the $CO_2$ enters the first storage reservoir. A fluid source 130 may be connected to a bore 132 placing the fluid in fluid communication with the second storage reservoir 112 and/or the third storage reservoir 114. The bore 132 may include a port 134 through which the fluid enters the second storage reservoir 112 and a second port 136 through which the fluid enters the third storage reservoir 114. The $CO_2$ and the fluid may be pumped or injected into their respective storage reservoirs under pressure.

Referring to FIG. 2B, an alternate method may include locating 202' a geological formation that includes the third storage reservoir 114 as described for FIG. 1 in addition to the first and second storage reservoir. This method may include the following additional steps: directing 210 a fluid into the third storage reservoir 114, with the fluid in the third storage reservoir at a third pressure, and maintaining 208' the second pressure and third pressure at generally the same or larger pressure than the first pressure of the carbon dioxide. The method may also include monitoring 212 the pressures in the first, the second, and the third storage reservoirs so that their respective pressures can be adjusted or maintained as needed to keep an overall balance of pressure within the geological formation, in particular the pressure acting on each seal layer.

The term "fluid," as used herein, includes any material that is capable of flowing into the porous, highly permeable rocks in a storage layer, especially gases, liquids, and solutions, suspensions, or dispersions of materials in gases or liquids. The fluid may be water or a composition including water and some chemicals (or a combination of fluids), in particular chemicals or other fluids that can further enhance the seal. The fluid may also be a gas or an oil brine from oil and gas field production.

The fluid can be modified to change its temperature or pH to minimize or control rates of acidification or other chemical reactions, by introducing seal-enhancing agents, by manipulating the density of the fluid to enhance the seal of the seal layers. The fluid density can be directly manipulated by addition of solids, thereby creating solution densities to increase pressure and addition of gas constituents to further create a series of various density materials, which both can be used to control the reservoir and seal system. In one embodiment, lost-circulation material may be added to the fluid to enhance the seal. Lost-circulation material refers to substances added to drilling fluids when drilling fluids are being lost to the formations downhole for example fibrous substances such as cedar bark, shredded cane stalks, mineral fiber and hair, flaky substances such as mica flakes and pieces of plastic or cellophane sheeting, or granular substances such as ground and sized limestone or marble, wood, nut hulls, Formica, corncobs, cotton hulls and swelling clays.

The fluid and the $CO_2$ may be injected into their respective storage reservoirs by drilling wells and perforating the adjacent reservoir and then pumping the fluid or $CO_2$ into the reservoir to increase the pressure. The fluid and the $CO_2$ may be injected sequentially or simultaneously. The fluid is extracted from other adjacent reservoirs not in contact with the $CO_2$ storage reservoir. Alternately, the fluid is obtained from an above ground source. The injection rate of the fluid may be controlled by specific placement of well injectors, which inject fluids to increase pressure in the fluid's storage reservoir. This increase in pressure outside of the $CO_2$ storage reservoir, i.e., in the fluid's storage reservoir, results in less differential in pressure across the cap rock or seal layer between the $CO_2$ storage reservoir and the fluid's storage reservoir, which provides the advantage of enhanced sealing capacity within the geological formation, and hence less risk of $CO_2$ leaks.

Figure 3:
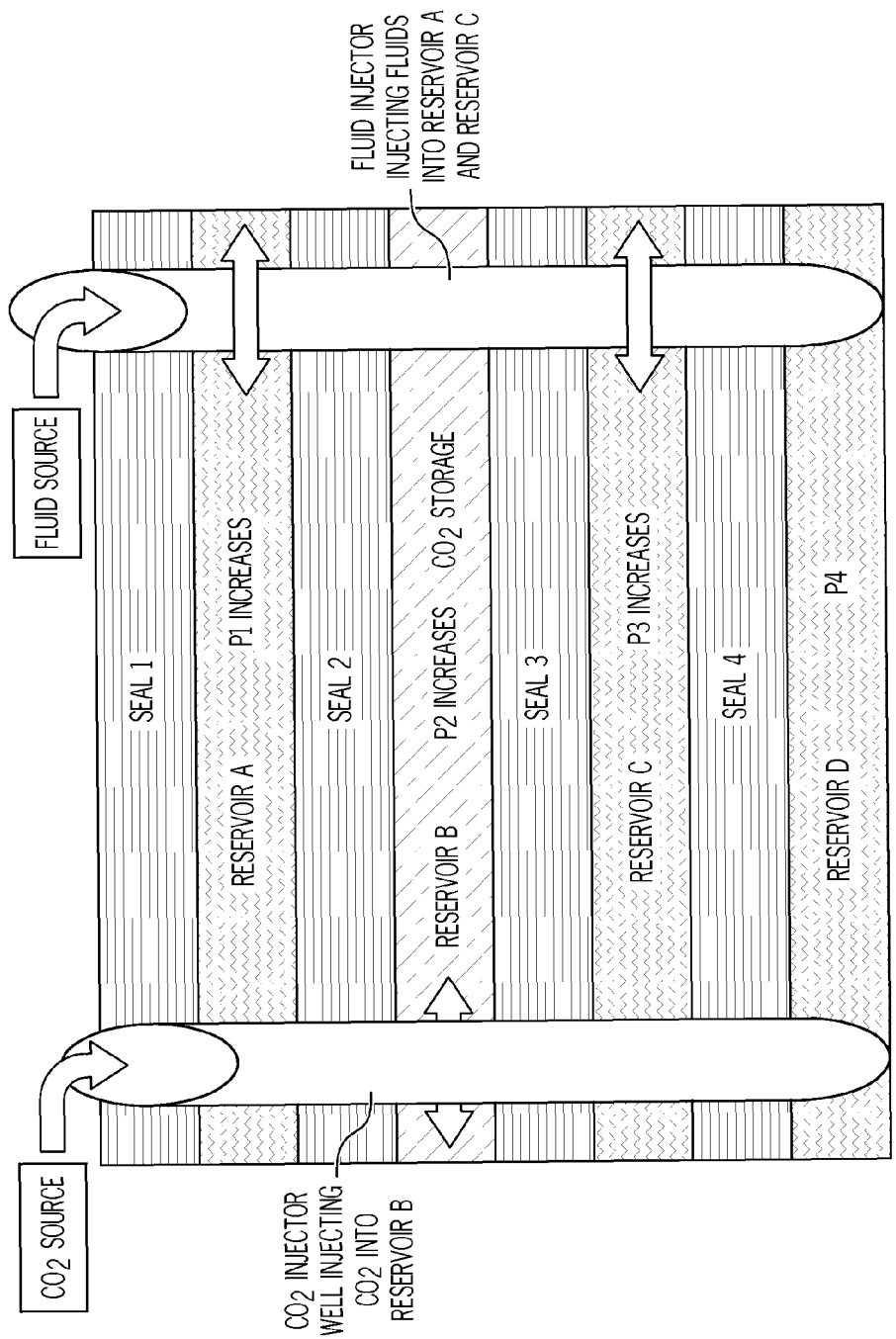
FIG. 3 is a side cross-sectional view of a geological formation including a fourth storage reservoir.

Referring now to FIG. 3, there are four reservoir zones, A-D, separated by seals with 4 seal layers shown as Seal 1, Seal 2, Seal 3, and Seal 4. Increasing the pressure in Reservoir A and C by injecting a fluid into A and C through perforations in well bores increases the pressure in A and C and provides a decreased differential in pressure across Seal 2 and Seal 3. Reservoir B is the reservoir into which the $CO_2$ is injected and stored. Seal 2 and Seal 3 define the capacity to store the $CO_2$ in Reservoir B. The $CO_2$ is being injected by well bores perforated into Reservoir B from a source of $CO_2$ at the surface. As the pressure is increased in Reservoir B with $CO_2$, this method increases proportionally the pressure in Reservoir A and C such that the differential pressure across the Seal 2 and Seal 3 stays at a minimum to maximize the sealing capacity of Seals 2 and 3. By maintaining pressure in balance it is possible to more safely store the $CO_2$ for a longer period of time. The pressure in each reservoir is noted on the diagram by P1, P2, P3, P4. Here, P1, P2, and P3 are kept as close as possible to the same pressure value to provide enhanced seal capacity to keep the $CO_2$ contained. Without the increased pressure in Reservoirs A and C the pressure in Reservoir B would increase until at some point the seal will fail, much sooner than by maintaining the pressure balance outlined by this process. In an alternate embodiment, P1 and P3 may be greater than P2 to further strengthen the seal.

Figure 4:
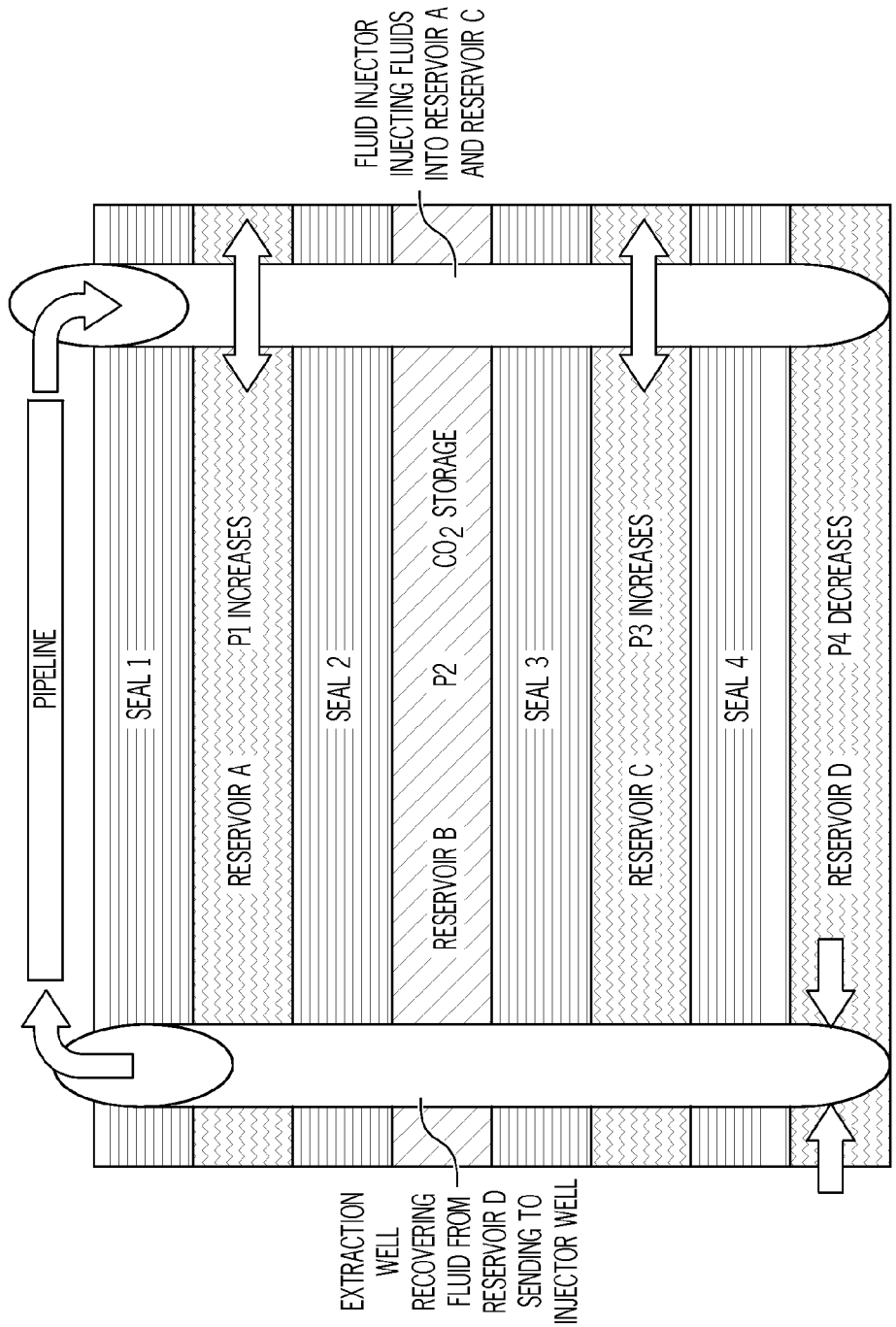
FIG. 4 is a side cross-sectional view of a geological formation including an extraction well for accessing an underground fluid source found in a fourth storage reservoir, the extraction well being in fluid communication with the second bore of FIG. 3.

In the embodiment of FIG. 4, the same geological formation of FIG. 3 is shown, except that the fluid for injection into Reservoirs A and C is from a subsurface reservoir deemed appropriate and safe, such as Reservoir D. The fluid is extracted from Reservoir D by an extraction well that pumps the fluid from the subsurface reservoir to the injector well connected to Reservoirs A and C.

Figure 5:
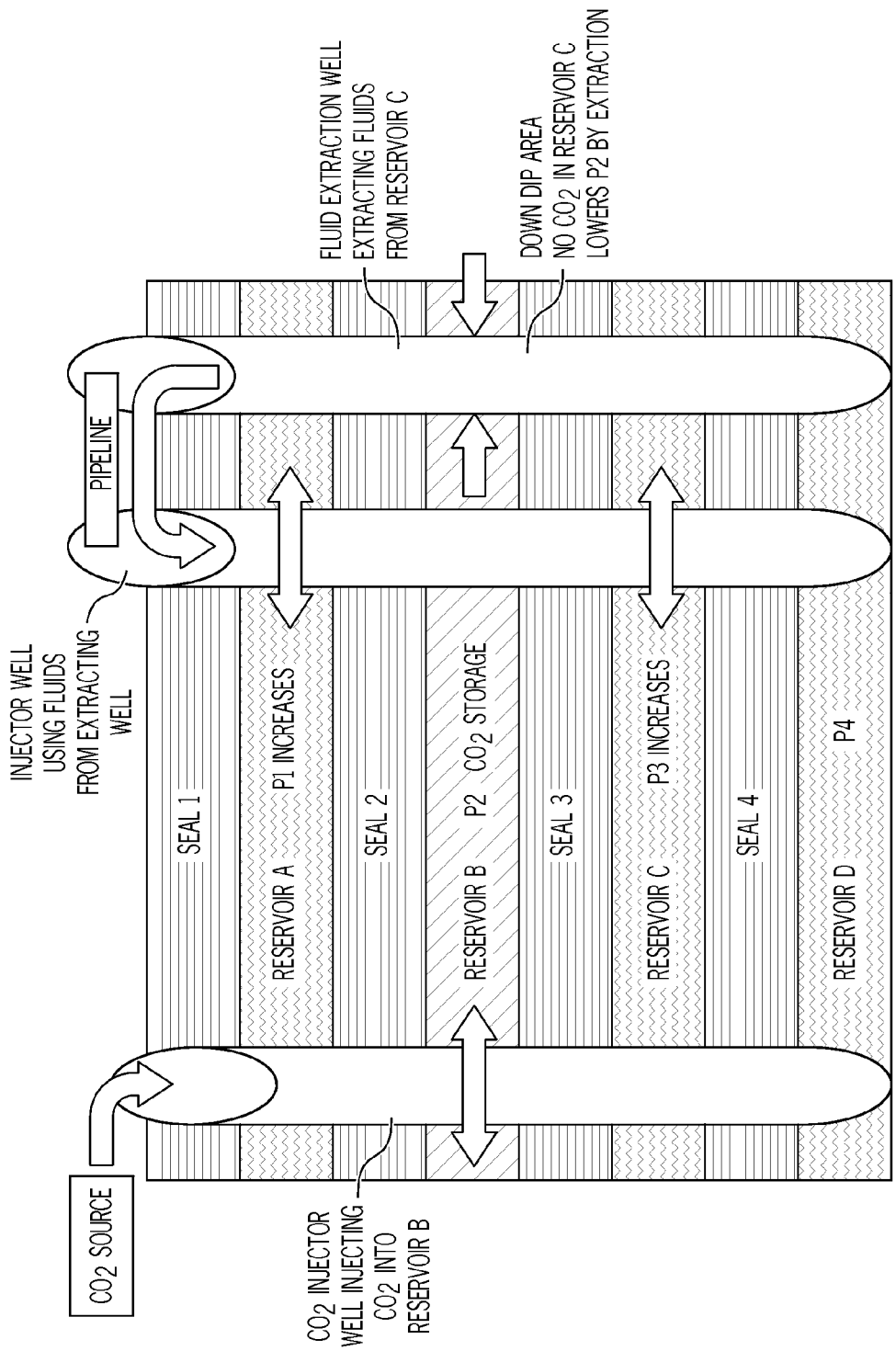
FIG. 5 is a side cross-sectional view of a geological formation including an extraction well for accessing a fluid free of $CO_2$ present in the first storage reservoir, the extraction well being in fluid communication with the second bore of FIG. 3 for distribution to the second and/or third storage reservoirs.

Alternately, as shown in FIG. 5 the fluid for injection into Reservoirs A and C can also come from Reservoir B itself. Here again the same general geological formation of FIG. 3 is shown, except that an extraction well connected to Reservoir B is shown. The extraction well should be connected to Reservoir B at a "down dip" or a lower structural point in Reservoir B where $CO_2$ is not present, so that the fluid taken from Reservoir B does not contain $CO_2$. This removal of fluid from Reservoir B has an added benefit in that it can lower the pressure in Reservoir B thereby further helping to maintain the pressure balance across the entire system.

While FIGS. 1-5 refer to an example geological formation with three to four reservoirs and four seal layers, one skilled in the art will appreciate that geological formation may have any combination of reservoirs, seal layers, and other geological layers. The geological formation can be selected for storage of the $CO_2$ below or above existing oil or gas fields.

The method disclosed herein also minimizes the pressure differential across the geological formation storing the $CO_2$ to maintain the integrity and maximize the effectiveness of the seal layers. When injecting fluids into their respective reservoirs the pressure is increased thereby affecting the pore pressure in the geological formation, it is this pore pressure that is controlled or maintained by the balance of the pressure in the storage reservoirs. The overburden pressure minus the pore pressure is the effective stress, which accounts for physical behavior of the rock formations. If pore pressure increases to close to the overburden pressure which is the pressure caused by the overlying rock column and fluids, it can cause the rock to fail as it reaches the fracture pressure. This method controls the pore pressure in the $CO_2$ storage reservoir rocks and the adjacent formations such that the pore pressure in the system does not approach the formation fracture pressure.

This same systematic control of pressure can be used to control pressures across fault zones thereby also enhancing the sealing and retention capability of a fault. The method is to then balance the pressure on either side of the fault by the same injection of fluids.

In yet another aspect, the method includes monitoring the pressure in the storage reservoirs. The pressure is monitored in Reservoir A, B, and C by taking periodic pressure measurements with pressure measuring devices by stopping injection in an injector well and making a pressure measurement at specific time intervals or by continuous monitoring. The pressure in any adjacent used or unused reservoirs can be continuously monitored using known techniques to drill wells specifically designed to just monitor pressure.

Other scientific methods, which support the proper pressure balance determination, include calculating the seal capacity of the rock formations by core analysis and/or capillary pressure measurements of the subsurface rock samples. The pressure monitoring can also be accomplished by standard type Bottom Hole Pressure buildups; in this way there is a monitoring of the entire pressure system over time. Additional monitoring devices such as detection devices for $CO_2$ in the storage reservoir and the adjacent reservoirs will also be utilized to monitor the effectiveness of the process.

The method also includes the cement used around the drilled injection boreholes, which are used to cement casing in place. The cement used in this method will contain mineral elements to further enhance the sealing capacity around wells drilled into the various reservoir and seal systems. The cement can be modified to use smaller particles and highly pulverized clays, which swell so as to further enhance the sealing capacity. These cements also take into account the chemical reactions of clays with $CO_2$, water, and brines. The method includes using all these various type cements, which are designed to be better sealing cements for reservoir containment.

The method also includes using horizontal wells or any subsurface well for the injection of $CO_2$. Using horizontal wells of various lengths allows for a minimum pressure increase over distance and is better than injecting $CO_2$ from a vertical well. The use of horizontal well injection for $CO_2$ and the seal reservoir balancing injectors is also a part of this method. The method of delivery of the injection of fluids utilizes controlled rates, which are optimal to prevent fracture generation by keeping pressure around the injection site to less than 90% of the calculated fracture gradient.

The use of proper pressure and temperature and fluids in the disclosed process is unique. The process scheme of using well bores in strategic positions to provide for injection or removal of fluids in combination to maintain a balance of pressures in the geological formation and provide the source for fluids to maintain this balance is unique.

Using the disclosed method, a subsurface storage reservoir formation can be brought into balance by the proper maintenance of injection rates and/or removal of the $CO_2$ and/or the fluid to achieve the desired balance of pressure within the $CO_2$ storage reservoir and the fluid storage reservoirs to enhance the seal of adjacent cap rock. This method also minimizes the damage caused by volume changes in the rock formations that results from pressure changes that change the volume of the reservoir rock (e.g., inflate or deflate the reservoir rock) and overburden the surrounding rock. Accordingly, safer long-term underground $CO_2$ storage is provided.

Although various aspects of the disclosed method for sequestering carbon dioxide in geological formations have been shown and described, modifications may occur to those skilled in the art upon reading the specification. The present application includes such modifications and is limited only by the scope of the claims.

What is claimed is:

1. A method for sequestering a subject fluid comprising:
    locating a geological formation comprising:
        a first storage reservoir having a first surface and a second surface;
        a first seal layer adjacent the first surface of the first storage reservoir;
        a second seal layer adjacent the second surface of the first storage reservoir; and
        a second storage reservoir adjacent the first or the second seal layers opposite the first storage reservoir;
    directing a subject fluid into the first storage reservoir, the subject fluid being at a first pressure within the first storage reservoir;
    directing water including a seal-enhancing agent into the second storage reservoir, the water being at a second pressure within the second storage reservoir; and
    maintaining the second pressure generally at least at the first pressure.

2. The method of claim 1, wherein the second storage reservoir is adjacent the first seal layer, the geological formation further comprising a third storage reservoir adjacent the second seal layer, and the method further comprising directing a second fluid into the third storage reservoir, the second fluid being at a third pressure within the third storage reservoir; and maintaining the third pressure generally at least at the first pressure.

3. The method of claim 1, wherein the geological formation further comprises a third seal layer adjacent the second storage reservoir and opposite the first seal layer, and a fourth seal layer adjacent the third storage reservoir and opposite the second seal layer.

4. The method of claim 1, further comprising monitoring the pressure in the first storage reservoir and the second storage reservoir.

5. The method of claim 1, wherein at least a portion of the water is from the first storage reservoir and is substantially free of $CO_2$.

6. The method of claim 1, further comprising forming a bore having a port entering the first storage reservoir and a bore having a port entering the second storage reservoir.

7. The method of claim 6, wherein the step of maintaining the second pressure includes controlling the injection rates of the water, the subject fluid or a combination thereof.

8. The method of claim 1 wherein the subject fluid is carbon dioxide.

9. A method for sequestering a subject fluid comprising:
  locating a geological formation comprising:
    a first storage reservoir having a first surface and a second surface;
    a first seal layer adjacent the first surface of the first storage reservoir;
    a second seal layer adjacent the second surface of the first storage reservoir;
    a second storage reservoir adjacent the first seal layer opposite the first storage reservoir; and
    a third storage reservoir adjacent the second seal layer
  directing a subject fluid into the first storage reservoir, the subject fluid being at a first pressure within the first storage reservoir;
  directing a second fluid into the second storage reservoir, the second fluid being at a second pressure within the second storage reservoir;
  maintaining the second pressure generally at least at the first pressure;
  directing a third fluid into the third storage reservoir, the third fluid being at a third pressure within the third storage reservoir; and
  maintaining the third pressure generally at least at the first pressure.

10. The method of claim 9 wherein the second fluid and the third fluid are one and the same.

11. A method for sequestering a subject fluid comprising:
  locating a geological formation comprising:
    a first storage reservoir having a first surface and a second surface;
    a first seal layer adjacent the first surface of the first storage reservoir;
    a second seal layer adjacent the second surface of the first storage reservoir; and
    a second storage reservoir adjacent the first or the second seal layers opposite the first storage reservoir;
  directing a subject fluid into the first storage reservoir, the subject fluid being at a first pressure within the first storage reservoir;
  directing a second fluid into the second storage reservoir, the second fluid being at a second pressure within the second storage reservoir; and
  maintaining the second pressure generally at least at the first pressure;
  wherein at least a portion of the second fluid is from the first storage reservoir and is substantially free of $CO_2$.

* * * * *